United States Patent [19]

Hall

[11] Patent Number: 4,727,584

[45] Date of Patent: Feb. 23, 1988

[54] LOUDSPEAKER WITH MOTIONAL FEEDBACK

[75] Inventor: David S. Hall, Palo Alto, Calif.

[73] Assignee: Velodyne Acoustics, Inc., Santa Clara, Calif.

[21] Appl. No.: 829,783

[22] Filed: Feb. 14, 1986

[51] Int. Cl.[4] .......... H04M 1/00

[52] U.S. Cl. .......... 381/96; 381/202; 381/204

[58] Field of Search .......... 381/96, 202, 204; 181/164, 170, 184

[56] References Cited

U.S. PATENT DOCUMENTS

| | | | |
|---|---|---|---|
| 1,990,409 | 2/1935 | Lawrance | 181/164 |
| 2,106,815 | 2/1938 | Scheldorf | 181/164 |
| 2,531,634 | 11/1950 | Lawrance | 181/164 |
| 3,111,189 | 11/1963 | Scholl | 181/164 |
| 3,174,578 | 3/1965 | Kojima | 181/184 |
| 3,937,887 | 2/1976 | Miller | 381/96 |
| 4,076,098 | 2/1978 | Ward | 181/170 |
| 4,275,278 | 6/1981 | Sakurai | 181/170 |
| 4,381,831 | 5/1983 | Putnam | 181/184 |
| 4,395,588 | 7/1983 | Franssen | 381/96 |
| 4,573,189 | 2/1986 | Hall | 381/96 |

FOREIGN PATENT DOCUMENTS

| | | | |
|---|---|---|---|
| 2631792 | 7/1986 | Fed. Rep. of Germany | 381/96 |
| 22965 | of 1908 | United Kingdom | 181/184 |

*Primary Examiner*—Jin F. Ng
*Assistant Examiner*—L. C. Schroeder
*Attorney, Agent, or Firm*—Parmelee, Bollinger & Bramblett

[57] ABSTRACT

Improvements in a moving-coil loudspeaker system of the type incorporating motional feedback. An accelerometer mounted on the loudspeaker coil to develop the feedback signal is enclosed within an air-tight shield can to avoid low-frequency instability. High-frequency stability is enhanced by various means including use of a "trumpet" shaped speaker cone, an inverted (concave) dust cap, and theta-dependent cone variations such as providing clusters of holes through the speaker cone to alter the propagation of sound waves radially in selected sectors of the cone. Also disclosed is the use of weights placed on the loudspeaker coil in selected locations circumferentially with respect to the accelerometer to minimize instability effects.

23 Claims, 7 Drawing Figures

LOUDSPEAKER WITH MOTIONAL FEEDBACK

BACKGROUND OF THE INVENTION

1. Field of the Invention

This invention relates to sound reproduction. More particularly, this invention relates to high fidelity loudspeaker systems of the motional-feedback type.

2. Prior Art

In my copending U.S. patent application Ser. No. 543,375 filed Oct. 19, 1983, there is disclosed a means for improving substantially the performance of high-fidelity loudspeaker systems. In accordance with that disclosure, which is incorporated herein by reference, such a result is achieved by feedback means including a small motion-sensing element, such as an accelerometer, mounted on the speaker coil. The output of that motion-sensing element is fed back negatively to the amplifier driving the coil, to assure that the loudspeaker motion faithfully tracks the sound signal.

Speakers manufactured in accordance with the teachings of that patent application have produced excellent results. However, it has been found that, particularly for low-frequency speaker systems such as "sub-woofers", improvements can be effected in several respects. Particularly, it has been found that low frequency stability of the feedback loop can be improved by sealing the shield can housing the motion-sensing element so as to form an air-tight enclosure for that element. Also high frequency stability can be enhanced by controlling acoustic effects in the cone-coil system in several ways, so as to de-tune the system.

Accordingly, it is a primary object of the present invention to provide a speaker of the motional feedback type with improved stability. Other objects, aspects, and advantages of the invention will in part be pointed out in, and in part apparent from, the following description considered together with the accompanying drawings.

DESCRIPTION OF THE PREFERRED EMBODIMENT

Figure 1:
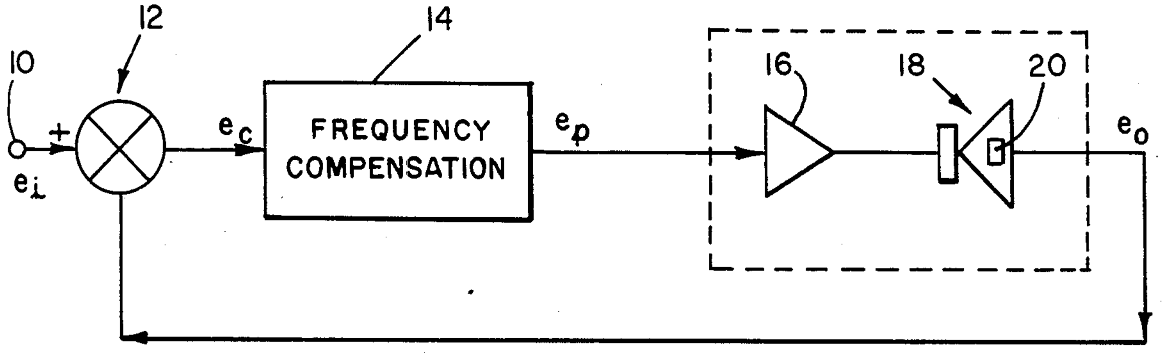
FIG. 1 is a block diagram of a loudspeaker system of the motional feedback type.

Referring first to FIG. 1, the complete loudspeaker system comprises the usual input terminal 10 receiving the input drive voltage $e_i$ representing the sound signal to be reproduced. This voltage is applied to a summing point generally indicated at 12. The summing point signal is fed as a voltage labelled $e_c$ to a frequency-compensation network 14. The output signal of this network $e_p$ drives a power amplifier 16 and loudspeaker 18. The loudspeaker coil carries an accelerometer 20 and an associated charge amplifier 22 which produce an output voltage $e_o$. This output voltage is degeneratively fed back to the summing point 12 where it is summed with the input drive voltage $e_i$.

Figure 2:
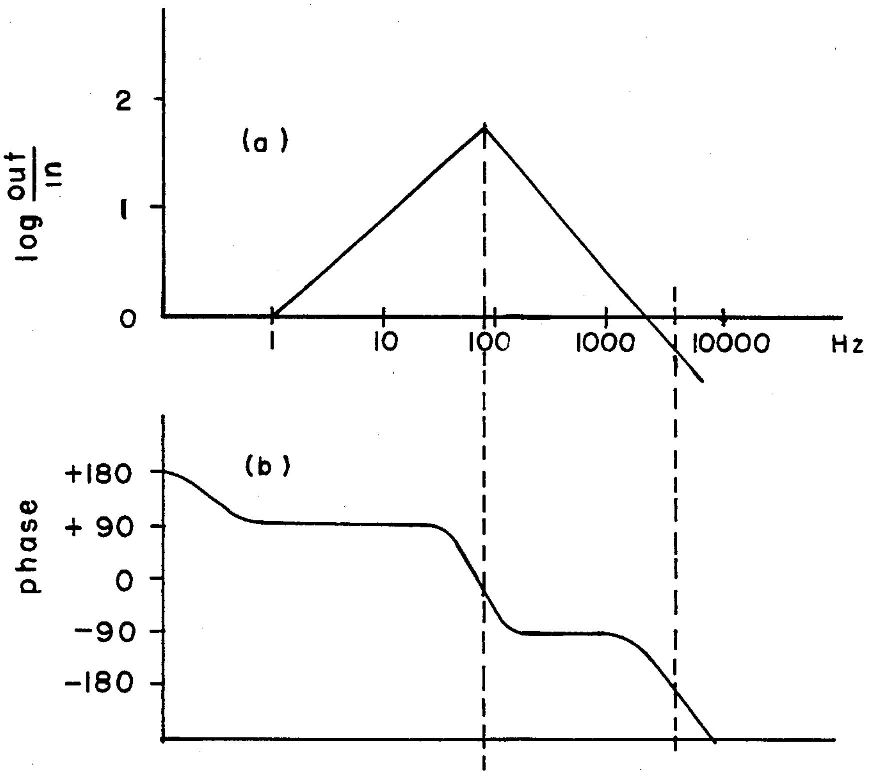
FIG. 2 is a Bode plot of a motional feedback speaker system.

FIG. 2 illustrates a generalized open loop transfer function (Bode plot) of a speaker system of the type shown in FIG. 1. It has been discovered that a low-frequency oscillation can occasionally develop in such a system. For example, such an oscillation can occur near the one Hz unity-gain crossover frequency. It appears that this oscillation results from air pressure activity on the accelerometer due to the movement of the cone and associated components. Such pressure on the accelerometer due to movement of the cone can be 180° out of phase with the acceleration signal, or, in phase with the acceleration signal. In any event, the air pressure signal due to movement of the cone is undesirable, at least in part because of the uncertainty of its magnitude.

In accordance with an important aspect of the present invention, such low frequency instability is avoided by sealing the sensing element (in the preferred embodiment, an accelerometer) in an airtight can. This prevents any interaction between the air-pressure variations inside the speaker enclosure (such as due to cone movement) and the feedback signal produced by the accelerometer. It has been found that this avoids instability effects which otherwise could occur. The container for the motion-sensing element can be sealed in any of many ways; one preferred sealing arrangement comprises coating the outside of the can with epoxy.

Figure 3:
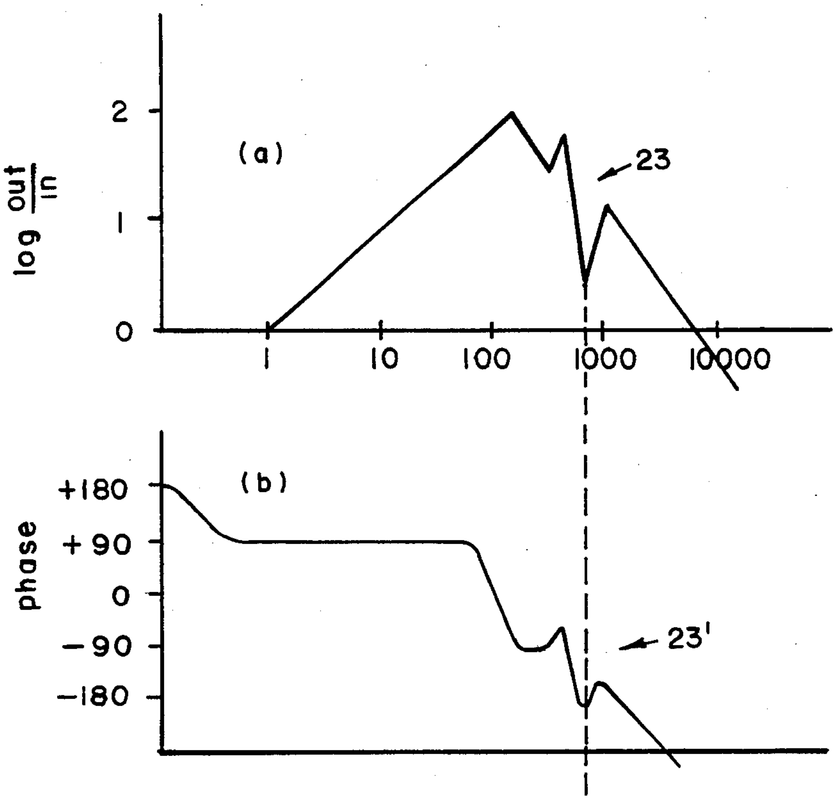
FIG. 3 is a plot similar to FIG. 2 illustrating an anomaly which is corrected by this invention.
Figure 4:
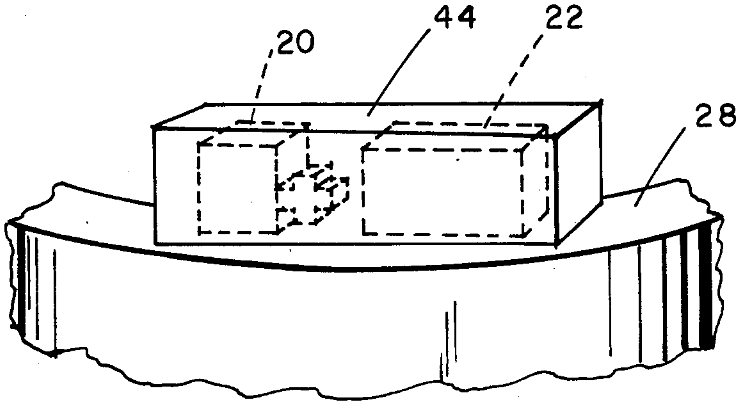
FIG. 4 illustrates a sealed accelerometer container in accordance with the invention.

It also has been found that high frequency instability can develop in a loudspeaker system as described above. It is believed that this instability is caused by acoustic resonances of sound waves propagating through the cone material between the coil and the surround. These waves interact with the motion-sensing element, causing deviations in the transfer function which can lead to instability. FIG. 3 illustrates how an anomaly as shown at 23, 23′ can develop in the open loop transfer function such that the gain may still be above unity when the phase shift reaches 180°, thus resulting in oscillation.

The interactions of the acoustic waves in the speaker system are extremely complex, and depend upon a number of factors which are difficult to control in manufacture. In any event, it appears that the observed high-frequency instability described above primarily arises from the presence of standing waves corresponding to one or more of the loudspeaker system's principal resonant modes (sometimes referred to as Mode I and Mode II waves).

These waves are axially symmetric and normally "theta-independent" (i.e. independent of radial angle about the center of the cone), and propagate outwardly along the cone radially. A Mode I wave is one having one-half wavelength spanning the distance from the coil to the surround. A Mode II wave has a wavelength extending from the coil to the dust cap. Mode II waves are reflected back to the coil at the point of attachment between the dust cap and the cone.

Mode I waves resonate at approximately 400 Hz in a 15 inch speaker. Mode II waves resonate at about 800 Hz when the dust cap is about 5 inches away from the coil. Such waves cannot simply be eliminated. However, it has been found that the system can be "detuned" by introducing "$\theta$-dependence" into the speaker cone construction, and/or by eliminating sudden discontinuities in the mechanical impedance of the cone, such as those occurring at the joint between the dust cap and the cone.

More specifically, now, it has been found that such high-frequency instabilities can be overcome by one or more of the following: (1) employing a cone having a "trumpet" shaped appearance; (2) inverting the dust cap; (3) introducing a theta-dependency into the phase speed of waves propagating radially outwardly of the cone; and (4) placing weights about the circumference of the coil former in selected positions relative to the accelerometer.

Figure 5:
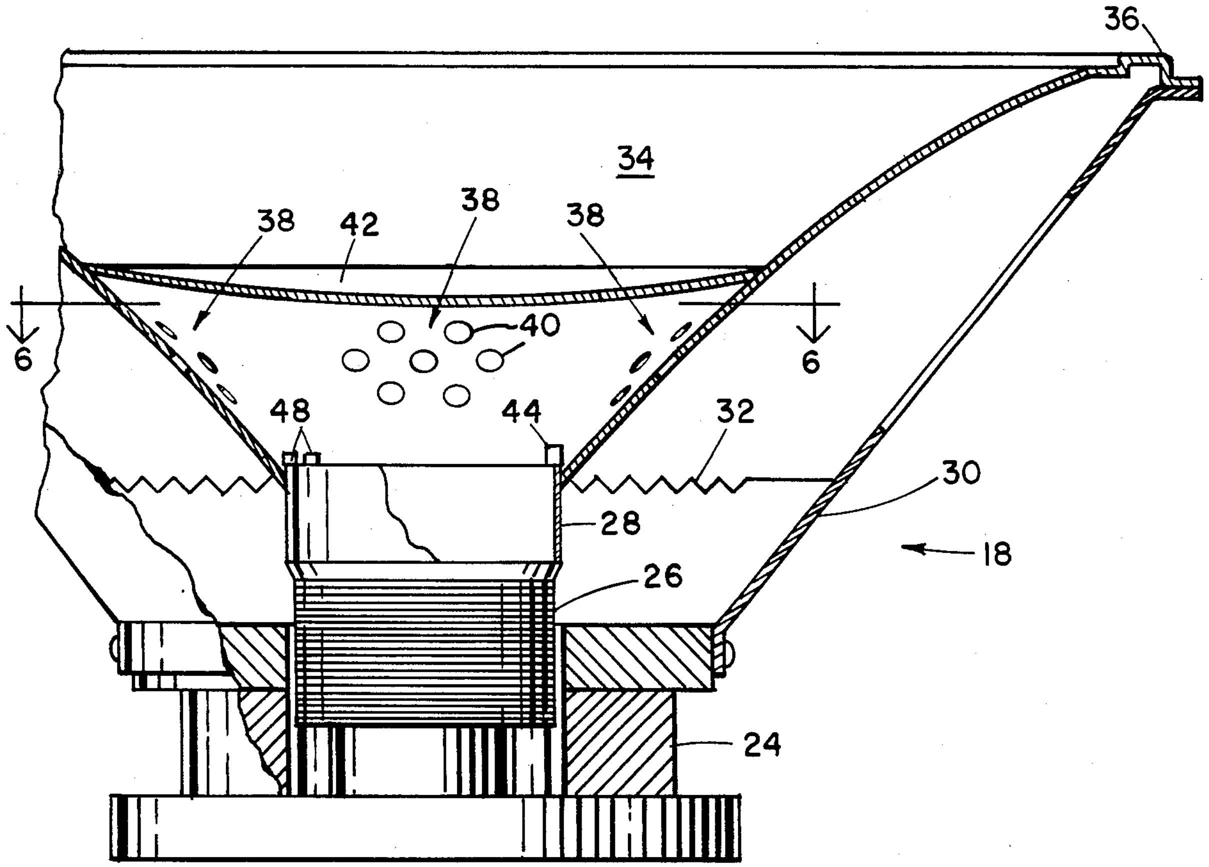
FIG. 5 is a partial cross-section of a speaker constructed in accordance with the present invention.

Referring now to FIG. 5, there is illustrated a loudspeaker 18 in accordance with the present invention which includes a conventional magnet assembly 24 and moving coil 26 surrounding the usual cylindrical coil former. Mounted atop the coil 26 is an aluminum ring 28. A rigid, conical basket 30 extends outwardly from the magnet assembly 24. A conventional spider 32 holds the coil 26 in proper alignment as it moves in the airgap of magnet assembly 24.

Figure 6:
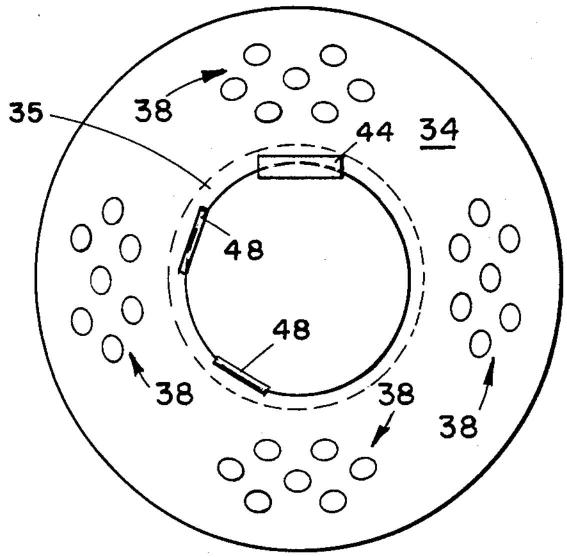
FIG. 6 is a cross-section taken substantially along the lines 6—6 of FIG. 5.

A loudspeaker cone 34 extends up from the ring 28; the acute-angled region between the ring and cone is filled with an epoxy fillet 35 (FIG. 6). As shown in FIG. 5, the cone is flared with a curved or "trumpet" shape. More particularly, the cone has a configuration in longitudinal cross-section which is convexly curvilinear as viewed from the interior of the cone, thereby presenting a trumpet-shaped appearance. Lines tangent to the surface of the cone at progressively increasing distances from the center of the cone will develop increasingly larger angles with a line axially through the center of the cone.

Advantageously, such angle at the point of attachment to the ring 28 is relatively small, e.g. no more than about 30°. Outwardly from the point of attachment, the change in such angle should be gentle; that is, there should be no sharp changes in angle. In the region close to the point of attachment, for example within a lineal distance from the point of attachment equal to one coil diameter, the change in angle preferably is no greater than about 15 degrees.

The cone 34 is connected by flexible surround material 36 to the edge of the basket 30. Referring also to FIG. 6, the cone is pierced by four clusters 38 of holes 40. In the embodiment illustrated, each cluster comprises one central hole and six surrounding holes in circular array. The clusters 38 are positioned at 90° intervals (radial angle) around the center of the cone. A central dust cap 42 is secured to the center of the cone 34. The dust cap is concave, as viewed from above, rather than being convex.

As discussed above, the housing (or shield can) 44 for the accelerometer 20 and charge amplifier 22 is completely sealed, so as to be airtight. This sealed can 44 isolates the sensitive element of the accelerometer from the effects of cone displacement.

It is believed that the use of a flared or trumpet-shaped cone 34 broadens the Mode I resonance, because such a shape does not produce well defined radial modes of wave propagation. The trumpet shape acts as a wave guide, terminating at the surround at a substantially non-reflective edge. By employing an inverted dust cap 42, Mode II waves do not reflect back to the accelerometer as strongly as when using a conventional convex cap.

The function of the hole clusters 38 is to control the speed of waves propagating radially outward of the cone, so as to provide that the speed varies to some extent with the radial angle. That is, the propagation speed in the sectors containing a cluster of holes will be different from an adjoining sector not containing such a cluster. Sonic waves resonate at a slightly higher frequency between the hole clusters than through the clusters. The consequence of such an arrangement is that a somewhat "jumbled" pattern of sound waves is created, which apparently combine in a fashion to prevent marked resonance effects leading to instability.

Figure 7:
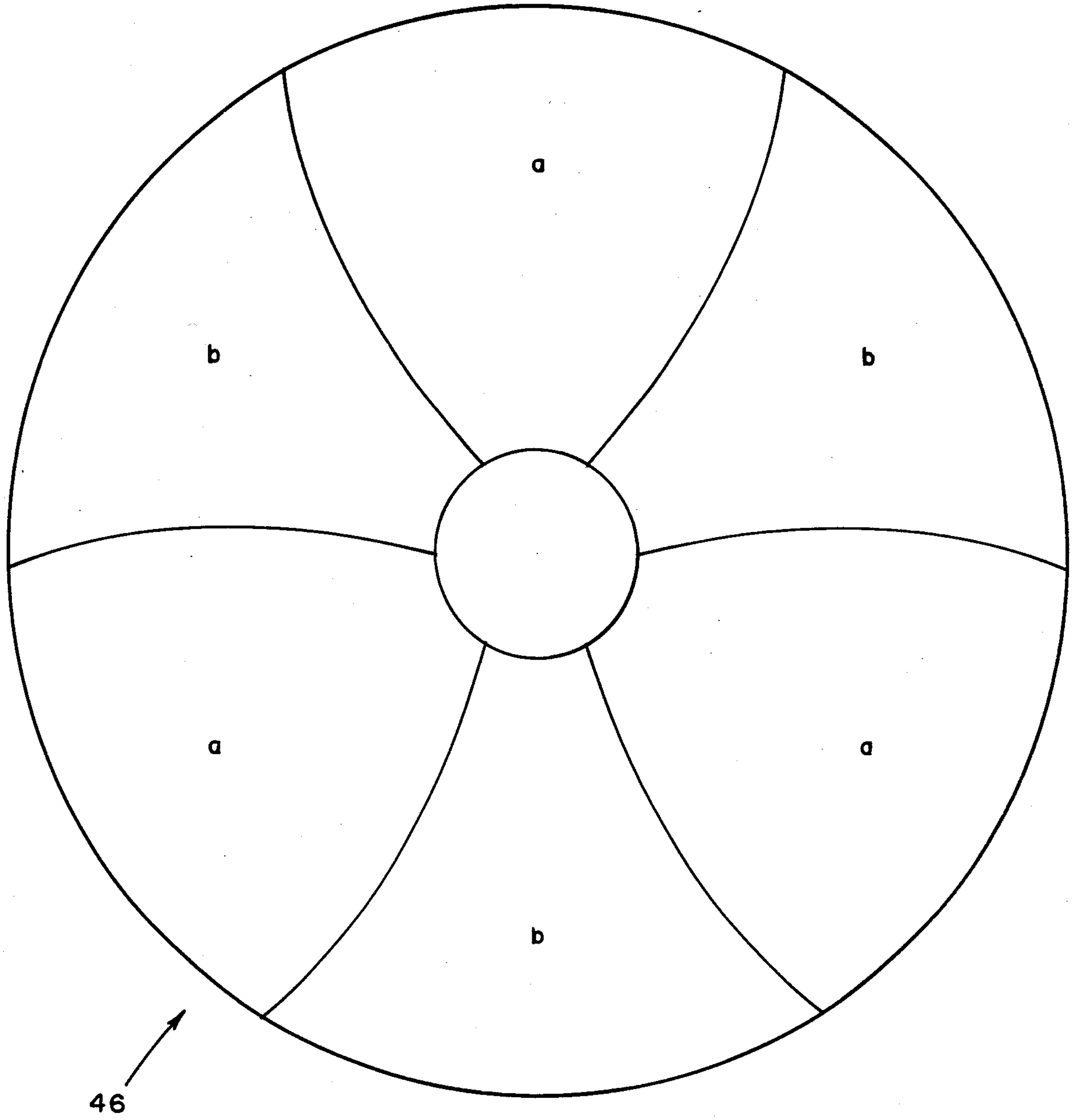
FIG. 7 is a plan view of a modified speaker cone in accordance with the invention.

There are other ways to introduce "$\theta$ dependence" in the speed of the waves as they propagate outwardly of the cone. For example, FIG. 7 illustrates a cone 46 designated as having "a" and "b" sectors. The cone is constructed so that the elastic properties of sectors "a" and "b" are different. One way of achieving this is, for example, to add a dopant to each "a" sector to change its rigidity relative to the adjoining "b" sector. Another way to adjust the material properties is to make the cone 46 out of a glass fiber reinforced resin; by changing the orientation of the glass fibers between "a" and "b" sectors, the speed of the waves may be controlled in those sectors so that the speed in adjoining sectors is different.

Another approach to the problem is to place a number of weights 48 on the coil. If the total mass is properly selected (usually about twice the mass of the sealed accelerometer unit), the interaction between the acoustic waves in the cone and the accelerometer can be reduced. That is, the primary interaction is shifted to the weights which were introduced into the system on other sections of the coil former.

The weight positions are chosen by randomly selecting an initial configuration of weights about the circumference of the coil former, and by then adjusting each position until it is deemed suitable by observing the Bode plots for the system using a spectrum analyzer. For example, the positions can be adjusted until the phase angle at a gain ratio of unity provides ample margin of safety (e.g. 35–40 degrees) away from the 180° phase shift. By doing this in manufacture, each speaker can be "tuned" to provide an improved phase margin and thus avoid oscillation.

It is believed that the many advantages of this invention will now be apparent to those skilled in the art. It will also be apparent that a number of variations and modifications may be made without departing from its spirit and scope. Accordingly, the foregoing description is to be construed as illustrative only, rather than limiting.

What is claimed is:

1. In a loudspeaker of the moving-coil type, the combination of:

a motional transducer element secured to the moving coil of said loudspeaker;

negative feedback means coupled to said transducer to combine the transducer signal with a loudspeaker audio signal to form a closed feedback loop;

an amplifier having its input coupled to the composite of transducer and audio signals, the output of said amplifier driving said moving coil; and air-tight housing means containing said motional transducer element to prevent external pressure variations from affecting the functioning of said transducer element.

2. Apparatus as claimed in claim 1, wherein said transducer element is positioned directly in line with said coil so as to respond directly proportionately to the coil movements.

3. Apparatus as claimed in claim 1, wherein said transducer is an accelerometer.

4. Apparatus as claimed in claim 3, wherein said accelerometer is a piezo-electric element.

5. Apparatus as claimed in claim 4, wherein said accelerometer comprises an element formed of lead zirconium titanate (Pb Zr Ti).

6. In a loudspeaker of the moving-coil type, the combination of:

a motional transducer element secured to the moving coil of said loudspeaker;

negative feedback means coupled to said transducer to combine the transducer signal with a loudspeaker audio signal to form a closed feedback loop;

an amplifier having its input coupled to the composite of transducer and audio signals, the output of said amplifier driving said moving coil; and a cone secured to the moving coil of said loudspeaker for converting coil movement into sound pressure signals, said cone having a configuration in longitudinal cross-section which is convexly curvilinear as viewed from the interior of the cone, thereby presenting a trumpet-shaped appearance.

7. Apparatus as claimed in claim 6, wherein lines tangent to the surface of the cone at progressively increased distances from the center of the cone will develop increasingly large angles with a line axially through the center of the cone.

8. Apparatus as claimed in claim 7, wherein said angle with a line axially through the cone center is no greater than about 30° at the cone attachment point.

9. In a loudspeaker of the moving-coil type, the combination of:

a motional transducer element secured to the moving coil of said loudspeaker;

negative feedback means coupled to said transducer to combine the transducer signal with a loudspeaker audio signal to form a closed feedback loop;

an amplifier having its input coupled to the composite of transducer and audio signals, the output of said amplifier driving said moving coil; and a cone secured to the moving coil of said loudspeaker for converting coil movement into sound pressure signals, said cone comprising a plurality of radial sectors adjacent ones of which have different sound propagation properties.

10. Apparatus as claimed in claim 9, wherein said different properties are produced by holes piercing the cone material.

11. Apparatus as claimed in claim 10, wherein said holes are arranged in a plurality of clusters.

12. Apparatus as claimed in claim 11, wherein said clusters are positioned around the cone at 90° intervals.

13. Apparatus as claimed in claim 12, wherein each of said clusters comprises a central hole encircled by six substantially equally spaced holes.

14. Apparatus as claimed in claim 9, wherein said different properties are produced by constructing adjacent sectors of said cone of different materials.

15. Apparatus as claimed in claim 14, wherein the cone material is doped differently in different sectors.

16. Apparatus as claimed in claim 14, wherein adjacent sectors of said cone are formed from cloth having different fiber orientations.

17. Apparatus as claimed in claim 16, wherein said fibers are glass.

18. In a loudspeaker of the moving-coil type, the combination of:

a motional transducer element secured to the moving coil of said loudspeaker;

negative feedback means coupled to said transducer to combine the transducer signal with a loudspeaker audio signal to form a closed feedback loop;

an amplifier having its input coupled to the composite of transducer and audio signals, the output of said amplifier driving said moving coil; and a dust cap at the center of said cone, said dust cap having a concavely contoured configuration.

19. Apparatus as claimed in claim 18, wherein said cone is formed with a trumpet shape.

20. In a loudspeaker of the moving-coil type, the combination of:

a motional transducer element secured to the moving coil of said loudspeaker;

negative feedback means coupled to said transducer to combine the transducer signal with a loudspeaker audio signal to form a closed feedback loop;

an amplifier having its input coupled to the composite of transducer and audio signals, the output of said amplifier driving said moving coil; and at least one weight positioned on said coil, circumferentially displaced from said transducer element, to reduce instability.

21. Apparatus as claimed in claim 20, comprising a plurality of said weights, radially displaced about said coil at positions selected to minimize instability.

22. Apparatus as claimed in claims 20 or 21, wherein the total mass of said weights is about twice the mass of said transducer element.

23. Apparatus as claimed in claim 20, wherein said transducer element comprises an accelerometer.

* * * * *